Feb. 23, 1937.  G. T. MUSTIN  2,071,851
WINDSHIELD WIPER
Filed Feb. 10, 1936  4 Sheets-Sheet 2
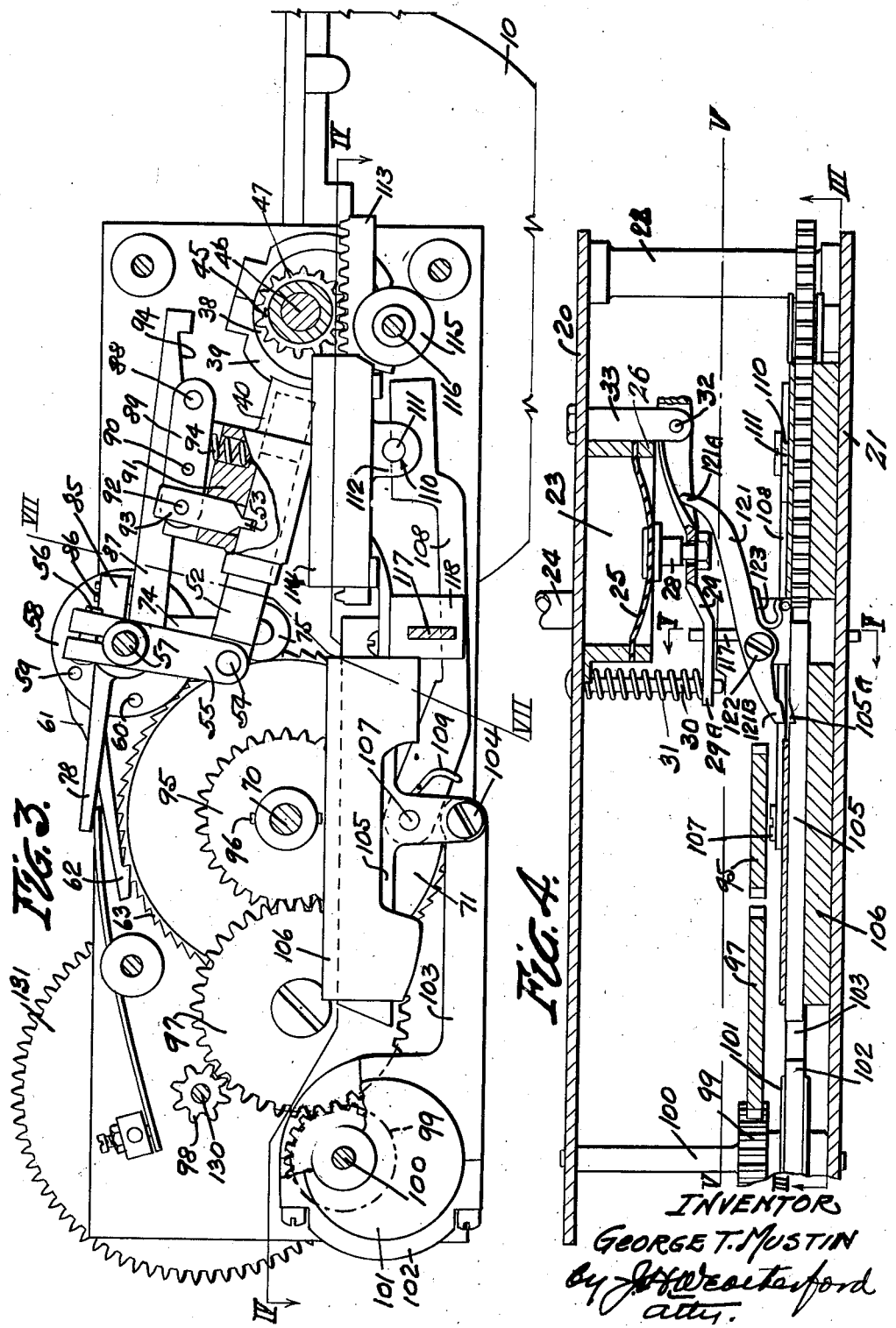
INVENTOR
GEORGE T. MUSTIN

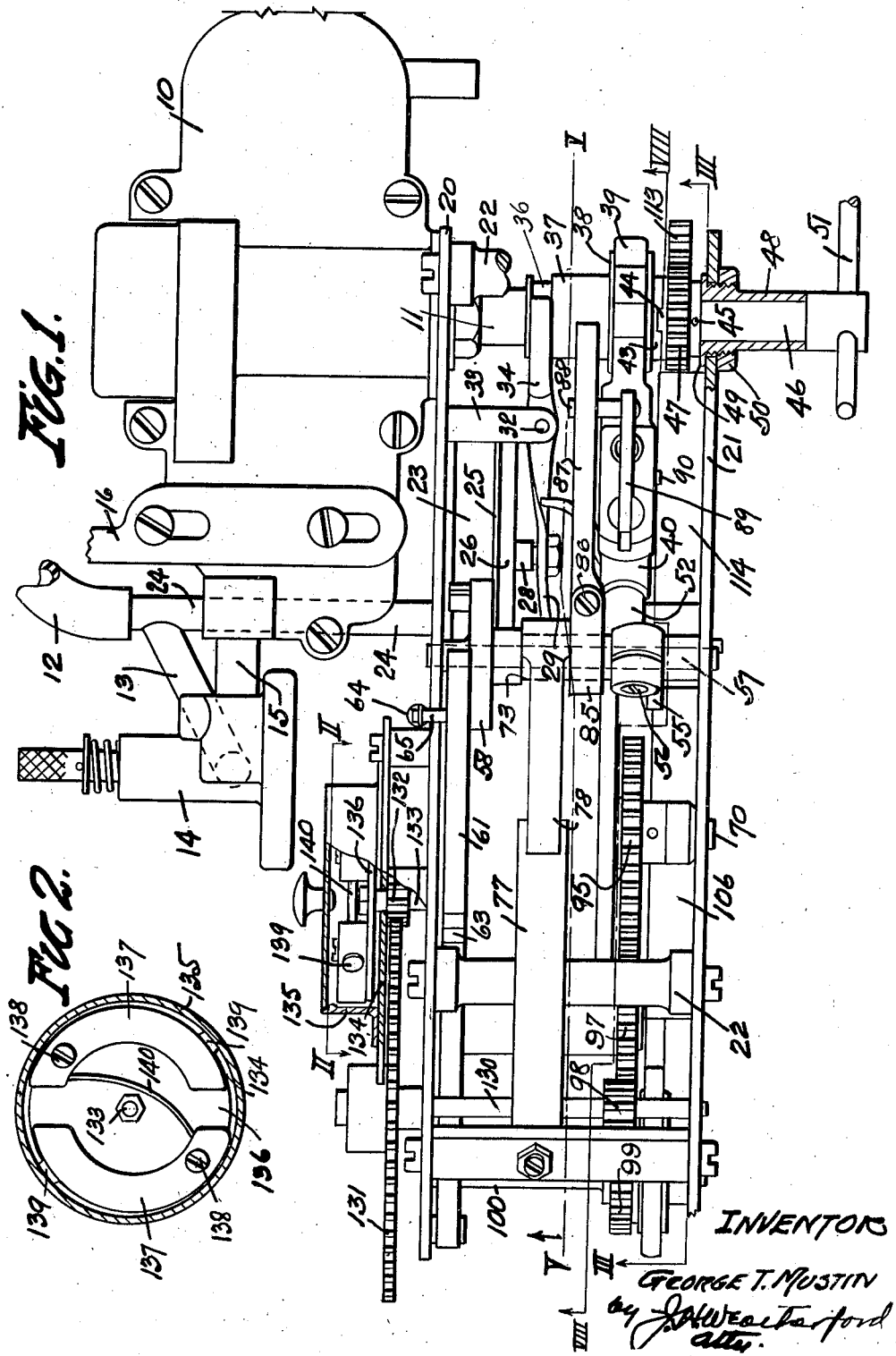

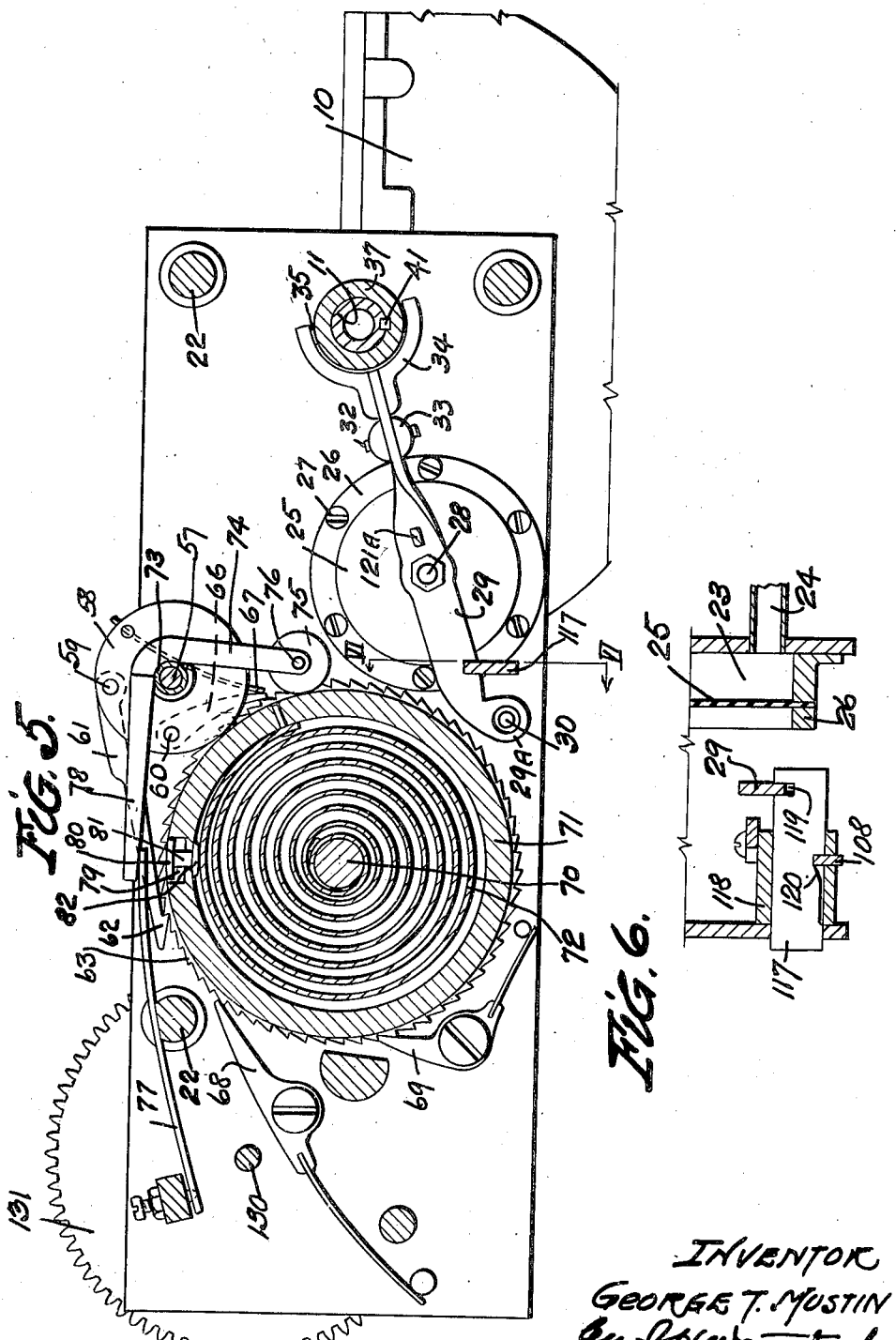

Feb. 23, 1937. G. T. MUSTIN 2,071,851
WINDSHIELD WIPER
Filed Feb. 10, 1936 4 Sheets-Sheet 4
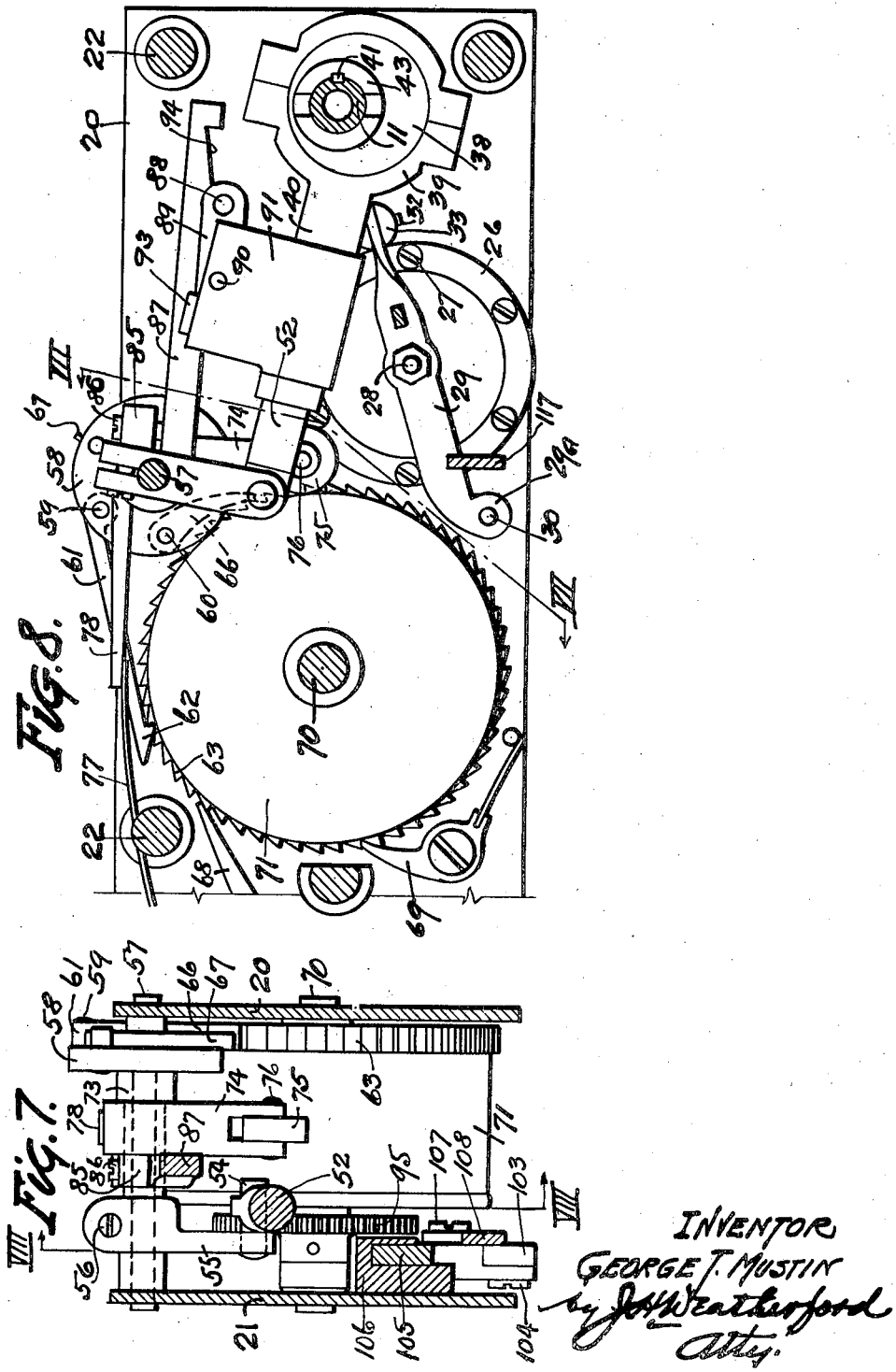
INVENTOR
GEORGE T. MUSTIN
by J. H. Weatherford
Atty.

Patented Feb. 23, 1937

2,071,851

UNITED STATES PATENT OFFICE 2,071,851

WINDSHIELD WIPER

George T. Mustin, Memphis, Tenn.

Application February 10, 1936, Serial No. 63,057

9 Claims. (Cl. 60—7)

This invention relates to improvements in windshield wipers for automobiles and has particular reference to improvements in wipers actuated by the vacuum set up in the intake manifold of the automobile engine.

In the operation of the car under some conditions there is such a drop in the vacuum, that there is insufficient power to operate the wiper, and particularly where this occurs at high car speeds there is a dangerous failure of action at a time when such action is most needed.

The primary object of the present invention is to provide auxiliary means for actuating the wiper during drops in vacuum.

Further objects are:

To provide means for establishing during normal operation of the wiper, an auxiliary reserve of power available for use during such drops in vacuum.

To provide means for automatically cutting off such establishing means when a predetermined reserve has been established.

To provide means released by the drop in vacuum for automatically cutting in said reserve power to operate the wiper during low vacuum and for disconnecting said power when normal vacuum is restored.

To provide means for governing the speed of said wiper during auxiliary power operation; and To improve the details of design and construction of such apparatus.

The means by which these and other objects are accomplished, and the manner of their accomplishment will readily be seen from the following description on reference to the accompanying drawings, in which,—

Fig. 1 is a plan view of my device on a somewhat enlarged scale.

Fig. 2 is a section taken as on the line II—II of Fig. 1.

Fig. 3 is a sectional elevation with a cover plate cut away along the line III—III of Figs. 1 and 4.

Fig. 4 is a sectional plan taken on the line IV—IV of Fig. 3.

Fig. 5 is a sectional elevation taken on the line V—V of Figs. 1 and 4; and

Fig. 6 is a fragmentary section taken on the line VI—VI of Fig. 5.

Fig. 7 is a sectional elevation taken on the line VII—VII of Figs. 3 and 8.

Fig. 8 is a sectional elevation taken on the stepped line VIII—VIII of Figs. 1 and 7.

Referring now to the drawings in which the various parts are indicated by numerals, 10 is the casing of a well known type of vacuum operated windshield wiper, such as is shown in Patent No. 1,554,528, which casing houses the operating mechanism, and 11 the protruding shaft which is oscillated by such mechanism in usual and well known manner. 12 is a tube leading from the intake manifold of the automobile engine (not shown), through a branch tube 13, member 14, not essential to the present device and pipe 15 into the wiper casing 10. 16 is the starting lever by which the wiper is cut on or off. The above parts constitute a usual type of wiper which is well known, and to which my device is auxiliary.

My device comprises a supporting frame which preferably includes a plate 20 which is connected to the casing 10 and a second plate 21 spaced and secured apart from the plate 20 as by posts 22.

23 is a vacuum chamber mounted on the plate 20 and to which the same vacuum tube 12 leads through a branch tube 24. One side of the vacuum chamber 23 is closed by a flexible diaphragm 25, as of sheet rubber which is shown secured to the chamber by a ring 26 and screws 27. Secured to the center of the diaphragm 25 is a post 28, movement of which is controlled by movement of the diaphragm. Loosely secured to the post 28 and movable thereby is a control arm 29, one end 29A of which arm is guided by a post 30 and is seated against a compression spring 31. The arm 29 is pivotally mounted as on a pin 32 carried by a post 33 rigidly secured to the plate 20, and beyond this post carries a yoke 34 having inwardly projecting pins 35 which engage an annular slot 36 in a sleeve 37, slidably mounted on the oscillating shaft 11 of the wiper. Integral with the sleeve 37 is an eccentric 38 around which is a strap 39 from which an eccentric rod 40 projects. 41 is a key which is carried by the sleeve 37 and slidably engages a complementary key-way in the shaft 11 constraining the sleeve and eccentric forming a part thereof to oscillate with the shaft. Formed on the outer face of the eccentric 38 is a clutch member 43 which engages with or may be disengaged from, a complementary clutch member 44, which is secured as by a pin 45 on an extension 46 of the shaft 11. 47 is a pinion preferably integral with the complementary clutch member 44. The shaft extension 46 is oscillatable in a bearing 48 secured to the plate 21 as by a flange 49 and nut 50. The shaft extension 46 carries the usual wiper arm 51 through which the wiper (not shown), is oscillated in usual manner.

The eccentric rod 40 is hollow and has slidably mounted therein an extension 52 which is held against movement relative to the other portion of the arm as by a lug 53 which engages a complementary slot in the arm extension 52, this lug being disengageable in manner to be hereinafter described to permit relative movement of the two portions of the rod.

The outer end of the rod extension 52 pivotally engages a pivot pin 54 and is longitudinally slidable along the pin, which is elongated to permit such movement when the eccentric 38 and rod 52 are shifted. The pin 54 is carried by an arm 55, which arm is securely clamped as by a screw 56 to an oscillatable shaft 57. Also suitably secured to, or integral with the shaft 57, is a crank disk 58, from the face of which two pins 59 and 60 project. 61 is a ratchet pawl one end of which is mounted on the pin 59 and the other end of which engages with the teeth of a ratchet wheel 63, the engaging end of the pawl 61 being held in engagement as by a tension spring 64 (Fig. 1), the upper end of which spring engages a lug 65 extending laterally from the pawl 61. 66 is a second pawl carried by the pin 60 and having its outer end also engaging the ratchet wheel 63, this pawl being held in engagement with the ratchet wheel as by a leaf spring 67. 68 and 69 are ratchet dogs which prevent retroactive motion of the ratchet wheel 63. It will be noted that the length of these dogs is such (Fig. 5), that they act alternately and are therefore adapted to secure the ratchet wheel against retroactive movement of one-half tooth space or more.

The ratchet wheel 63 is turnably mounted on a shaft 70 and is secured to a hollow drum 71 similarly mounted on the same shaft. Within the drum is a coil spring 72, one end of which is secured in usual manner to the cylindrical casing of the drum and the opposite end to the shaft 70, this spring storing the power for the auxiliary or reserve motor. Oscillatable movement of the shaft 11 acting through the eccentric 38, straps 39 and rod 40—52, the arm 55, shaft 57, crank disk 58 and ratchet pawls 61—66, winds the spring within the drum in usual manner, storing up reserve energy. Oscillatably mounted on the shaft 57 is a sleeve 73 to which is integrally secured a bell crank lever, one arm 74 of this lever carrying a roller 75 rotatably secured thereto as by a pivot pin 76. This roller is held in contact with the outer surface of the drum 71 by a spring 77 acting on the other arm 78 of the bell crank lever. The shell of the drum in the path of the roller 75 is cut away to form a recess 79 in which is disposed a sector 80 of the drum surface. This sector is carried by a pin 81 which projects through into the interior of the drum and is provided with a thin head 82, against which the outer convolution of the spring 72 presses when the spring is fully unwound thereby forcing the sector 80 outward, and forming a continuous track for the roller 75. Conversely when the spring 72 is wound up, the outer convolutions of the spring are eventually pulled away from the inner surface of the drum releasing the pressure on the head 82 of the pin, allowing the roller 75 to force the sector 80 inward, and to engage in the notch thus formed, incidentally stopping or tending to stop further turning of the drum. Also secured on the sleeve 73 as by a yoke 85 and a clamping screw 86 is an arm 87 which arm therefore moves in conformity with the movement of the roller 75. This arm 87 overlies a pin 88 secured to, and projecting laterally from a lever 89, which lever in turn is mounted on a pivot pin 90 carried by a bracket 91 forming part of the eccentric rod 40. The opposite end of the arm 89 is engaged as by a pivot pin 92, with a plunger 93 which plunger is slidably mounted in the bracket 91 and carries the lug 53. 94 is a compression spring acting against the lever 89 to hold the lug 53 normally in engagement and the pin 88 against the arm 87. When the roller 75 rolls along the surface of the drum 71 the arm 87 is held in raised position, and the lug 53 is effective to lock the two portions of the eccentric rod together. When however, the spring 72 is fully wound and the sector 80 thereby released and forced in by the action of the bell crank lever and the roller thereon, the arm 87 is depressed, disengaging the lug 53 and disconnecting the two parts of the eccentric rod thereby discontinuing winding action of the ratchet mechanism. It will be noted that the arm 87 moving with the part 52 of the eccentric rod has movement relative to the pin 88 in addition to the desired depressing movement, the underside of the arm therefore has been cut away along the line 94 to give a true sliding movement at such time.

The shaft 70, to which the inner end of the spring 72 is attached, extends beyond the drum 71 and carries a gear 95 which is secured to the shaft as by a pin 96. The gear 95 meshes with an idler gear 97 and through this gear with a pinion 98, and with a second pinion 99 (Fig. 4), which latter pinion is mounted on and secured to a shaft 100. Also secured on this shaft is an eccentric 101 which is turned by the pinion 99. 102 is the eccentric strap and 103 the eccentric rod. The rod 103 is secured as through a screw 104 to a member 105 slidably mounted in a guide 106.

Also secured to the member 105 as by a pivot pin 107 is a link 108, the outer end of which is normally held in raised position as by a spring 109. The link 108 is provided with a notch 110, which notch when the outer end of the link is held in raised position by the spring 109, engages a pin 111, carried by a bracket 112, secured to or integral with, and depending from a rack 113. The rack 113 is slidably mounted in a guide 114 and preferably also supported by a roller 115 suitably journaled on a pin 116, and when the notch 110 and pin 111 are in engagement, is constrained to reciprocate in conformity with the movement of the eccentric 101. The rack 113 meshes with the pinion 47 which pinion is pinned to the shaft 46 and when reciprocated imparts an oscillatory movement to the wiper arm 61.

Overlying the link 108, is a transversely disposed cam 117 which is slidably mounted in a suitable bracket 118, this cam being particularly shown in Fig. 6. The cam 117 is provided with a notch 119 which is engaged with the control arm 29 and shifts in conformity with the movement of such control arm, being held in the position shown in Fig. 6 when the diaphragm 25 is outward due to release of vacuum pressure. In this position a notch 120 in the cam overlies the link 108, allowing this link to be held upward and its outer end to engage the pin 111. Conversely when the diaphragm 25 is pulled inward by vacuum pressure the cam is shifted in conformity with such inward movement of the diaphragm, the inclined edge of the notch 120, forcing the link 108 downward, thereby disengaging the link from the pin 111 and therethrough from the rack 113.

121 is a detent arm pivotally mounted as on a pin 122. One end of this arm 121A rests against the control arm 29 and moves inward or outward in conformity with the diaphragm controlled movement of such control arm, being held thereagainst as by a spring 123. 121B is a detent on the opposite end of the arm 121, which is moved into or out of engagement with a notch 105A in the member 105 by such movement of the arm 121, the detent being engaged with the notch 105A when the diaphragm 25 is pulled inward by action of the vacuum and being disengaged by release of the vacuum. The detent 121B therefore engages the bar 105 and prevents actuation of such arm by the spring motor at such time as the wiper is being vacuum actuated, and releases the bar for spring motor action when the vacuum drops and becomes ineffective.

The pinion 98 is mounted on and suitably secured to a shaft 130 on which shaft is also secured a gear 131. This gear meshes with a pinion 132, which pinion is secured on a governor shaft 133. The shaft 133 extends through and is suitably journaled in the wall 134 of a cylindrical housing 135 and carries a disk 136 to which weights 137 are secured as by pivot pins 138, the weights being provided with contact shoes 139 of leather or other suitable material. Contact shoes are normally held away from the interior surface of the casing 135 as by a spring 140, and moving outward by centrifugal force to prevent excessive speed of the device when under action of the spring motor.

In using the device, when the engine of the car is running, vacuum is established through the pipes 12—24 into the vacuum chamber 23, retracting the diaphragm 25 and holding same retracted. This action similarly shifts the control lever 29 allowing the detent 121B to engage in the notch 105A and prevent action of the spring motor. This same shift also moves the cam 117 forcing the link 108 downward and disengaging the notch 110 in this link from the pin 111, leaving the rack 113 free to reciprocate. The fork 34 on the control lever 29 is also shifted and engages the two parts of the clutch 43—44, operatively connecting the vacuum wiper shaft 11 and the shaft 46 connected to the wiper blade. These conditions continuing so long as the engine running at such speed as to maintain a normal vacuum. At any time the starting lever 16 may be shifted in usual manner and the usual vacuum action of the wiper be set up the oscillatory motion thus set up in the shaft 11 being transmitted through the clutch 43—44, to the extension shaft 46 actuating the arm 51 by which the wiper (not shown) is oscillated. Such action will oscillate the pinion 47 and reciprocate the rack 113, but since this rack is free for movement it is readily shifted backward and forward.

At the same time the eccentric 38 is oscillated, and acting through the eccentric rod 40—52, the arm 55, the disk 58 and the pawls 60—66, sets up a winding action on the ratchet wheel 63 and attached drum 71 thereby winding up the spring 72 within the drum, this step by step ratchet movement being retained by the pawls 68—69, and movement of the shaft 70 being restrained through the gears 95, 97 and 99, the eccentric 101, and associated parts in connection with the detent 121B. This winding action on the spring within the drum continues so long as the vacuum wiper is being actuated, until the spring 72 is completely wound, at which time the outer convolutions of the spring are pulled away from the head 82 of the pin 81, allowing the sector 80 of the drum to move inward, the roller 75 to drop into the pocket thus formed, and the lever 87 to depress the pin 88 and withdraw the lug 53 from its notch, thus disconnecting the part 40 of the connecting rod from the part 52 thereof, after which time reciprocation of the eccentric is not further transmitted until such time as use of the spring motor shall automatically re-establish rewinding conditions.

Should the vacuum drop during operation of the wiper, causing vacuum actuation to cease, such drop in vacuum in the vacuum chamber 23 would allow the spring 31 to shift the diaphragm 25 outward as shown in Fig. 4, disconnecting the detent 121B and permitting the spring motor to go into operation. This same shift would concurrently move the cam 117 to the position shown in Fig. 6, allowing the link 108 to be moved upward by spring 109, engaging the notch 110 with the pin 111 and connecting the eccentric 101 with the reciprocable rack 113. Also concurrently with this movement, the yoke 34 of the control bar 29 would disconnect the clutch part 43 from the clutch part 44, leaving the shaft 46 free to oscillate independently of the vacuum action. Thereafter motion would be transmitted from the spring 72 through the shaft 70, and the gears 95, 97 and 99 to the eccentric 101, and the rack 113 be reciprocated, thus establishing spring actuated oscillation of the pinion 47 and similar oscillation of the shaft 46 connected thereto and of the wiper bar 51. Such action would continue so long as the vacuum was too low to actuate the vacuum wiper, but on re-establishment of sufficient vacuum to accomplish that purpose, the vacuum set up in the vacuum chamber 23 would again establish the cycle of winding conditions first recited, the conditions thereafter being alternated as changes in vacuum occur. During actuation of the wiper by the spring the governor driven through the pinion 98 and the gear 131 would automatically retard the speed of spring actuation and prevent its becoming excessive.

What I claim is:

1. The combination with a shaft, vacuum actuated means for oscillating said shaft, an extension for said shaft and means actuated by said vacuum for operatively connecting said extension to said shaft; of auxiliary means for actuating said extension; said auxiliary means including a spring actuated motor, means for governing the speed of said motor, means actuated by oscillation of said shaft for winding said motor, means adapted to operably connect said motor and said shaft extension, means for disconnecting said shaft from said extension, and for connecting said motor to said extension, and means actuated by said vacuum for rendering said disconnecting means ineffective.

2. The combination with a shaft, vacuum actuated means for oscillating said shaft, an extension for said shaft, and means, actuated by said vacuum, for operatively connecting said extension to said shaft; of auxiliary means for actuating said extension; said auxiliary means including a spring actuated motor, means actuated by oscillation of said shaft for winding said motor, means adapted to operably connect said motor and said shaft extension, means for disconnecting said shaft from said extension, and for connecting said motor to said extension, and means actuated by said vacuum for rendering said disconnecting means ineffective.

3. The combination with a shaft, vacuum actuated means for oscillating said shaft, an extension for said shaft and means actuated by said vacuum for operatively connecting said extension to said shaft; of auxiliary means for actuating said extension; said auxiliary means including a spring actuated motor, means actuated by oscillation of said shaft for winding said motor, means for disconnecting said winding means on completion of winding, means adapted to operably connect said motor and said shaft extension, means for disconnecting said shaft from said extension, and for connecting said motor to said extension, and means actuated by said vacuum for rendering said disconnecting means ineffective.

4. The combination with a shaft, vacuum actuated means for oscillating said shaft, an extension for said shaft, clutch means adapted to connect said extension to said shaft, and means actuated by said vacuum for effecting said connection; of a spring actuated auxiliary motor, means, actuated by oscillation of said shaft, for winding said motor, means for disconnecting said winding means; means adapted to oscillatably connect said motor and said shaft extension, spring means acting against said vacuum actuated connecting means and adapted to disconnect said clutch on cessation of vacuum operation and means actuated by said spring means for effecting said motor-shaft extension connection.

5. The combination with a shaft, vacuum actuated means for oscillating said shaft; an extension for said shaft, clutch means adapted to connect said extension to said shaft and means actuated by said vacuum for effecting said connection, of a spring actuated auxiliary motor, means actuated by oscillation of said shaft for winding said motor, means for disconnecting said winding means; means adapted to oscillatably connect said motor and said shaft extension, means preventing operation of said motor, spring means acting against said vacuum actuated connecting means and adapted to disconnect said clutch on cessation of vacuum operation, means actuated by said spring means for effecting said motor, shaft-extension connection, and means actuated by said spring means for releasing said motor for operation.

6. The combination with a shaft, vacuum actuated means for oscillating said shaft, an extension for said shaft, clutch means adapted to connect said extension to said shaft, and means actuated by said vacuum for effecting said connection; of a spring actuated auxiliary motor, means for governing the speed of said motor, means actuated by oscillation of said shaft for winding said motor, means released by winding-retraction of said spring for disconnecting said winding means; means adapted to oscillatably connect said motor and said shaft extension, means for preventing operation of said motor, spring means acting against said vacuum actuated connecting means and adapted to disconnect said clutch on cessation of vacuum operation, means actuated by said spring means for effecting said motor shaft-extension connection, and means actuated by said spring means for releasing said motor for operation.

7. The combination with a shaft, vacuum actuated means for oscillating said shaft, an extension for said shaft, clutch means adapted to connect said extension to said shaft, and means actuated by said vacuum for effecting said connection; of a spring actuated auxiliary motor, means governing the speed of said motor, means actuated by oscillation of said shaft for winding said motor, means released by winding-retraction of said spring, for disconnecting said winding means, means adapted to oscillatably connect said motor and said shaft extension, spring means acting against said vacuum actuated connecting means and adapted to disconnect said clutch on cessation of vacuum operation and means actuated by said spring means for effecting said motor-shaft extension connection.

8. The combination with a shaft, vacuum actuated means for oscillating said shaft, an extension for said shaft, clutch means adapted to connect said extension to said shaft, and means actuated by said vacuum for effecting said connection; of a spring actuated motor, means oscillated by said shaft, means, connected to said shaft oscillated means, for winding said motor, means released by winding retraction of said spring for disconnecting said winding means; oscillatable means driven by said motor, oscillatable means carried by said shaft extension, link means adapted to connect said motor and extension oscillating means, means engaging said link means to prevent operation of said motor; spring means acting against said vacuum actuated connecting means and adapted to disconnect said clutch on cessation of vacuum operation, means connected to said spring means for rendering said link connection operative, and means connected with said spring means for releasing said link to allow operation of said motor.

9. The combination with a shaft, vacuum means for oscillating said shaft, an extension for said shaft, clutch means adapted to connect said extension to said shaft, and means actuated by said vacuum for effecting said connection, of a spring actuated motor, including a motor shaft, a hollow drum rotatable on said motor shaft, said drum having an opening chambered in the cylindrical surface thereof, a sector adapted to complete said cylindrical surface, disposed in said opening and radially movable therein, a pin projecting from said sector into said drum, said pin having a head thereon within said drum limiting outward movement of said sector to a position flush with said drum surface, a coiled flat spring within said drum having one end secured to said drum and when unwound having its outer convolution lying against the shell of drum and against the head of said pin, said convolution being retractable away from said drum by winding action, the other end of said spring being secured to said motor shaft; a ratchet wheel secured to said drum, a ratchet pawl adapted to engage said ratchet wheel, means oscillatable with said shaft, means operatively connecting said pawl with said shaft-oscillatable means, means for disconnecting said operatively connecting means, said means including a roller resiliently urged against said sector completed surface and held in inactive position by said surface, and a disconnecting trip actuated by said roller on disruption of said surface by winding of said spring, means adapted to oscillatably connect said motor and said shaft extension, means preventing operation of said motor, spring means acting against said vacuum actuating means, means connected to said spring means for rendering said oscillatable connection means operative, means connected with said spring means, means for releasing said motor for operation, and means connected with said spring means for disconnecting said clutch.

GEORGE T. MUSTIN.